United States Patent
Kurt et al.

(10) Patent No.: US 7,221,515 B2
(45) Date of Patent: May 22, 2007

(54) OPTICAL DIFFRACTION ELEMENT

(75) Inventors: Ralph Kurt, Eindhoven (NL); Gert Wim 'T Hooft, Eindhoven (NL); Coen Theodorus Hubertus Fransiscus Liedenbaum, Eindhoven (NL); Robert Frans Maria Hendriks, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 10/561,861

(22) PCT Filed: Jul. 5, 2004

(86) PCT No.: PCT/IB2004/051119

§ 371 (c)(1),
(2), (4) Date: Dec. 21, 2005

(87) PCT Pub. No.: WO2005/003826

PCT Pub. Date: Jan. 13, 2005

(65) Prior Publication Data

US 2006/0279843 A1 Dec. 14, 2006

(30) Foreign Application Priority Data

Jul. 4, 2003 (EP) ................... 03102013

(51) Int. Cl.
*G02B 27/12* (2006.01)

(52) U.S. Cl. ................ 359/639; 359/559; 359/563

(58) Field of Classification Search ............... 359/639, 359/563, 559, 566, 568, 569, 570, 571, 573
See application file for complete search history.

(56) References Cited

U.S. PATENT DOCUMENTS 5,862,286 A 1/1999 Imanishi et al.
6,388,789 B1 5/2002 Bernstein

OTHER PUBLICATIONS

"Polarized Absorption Spectra of Single.." Li et al, Physical Review Letters, vol. 87, No. 12, Sep. 17, 2001.
"Orientation and Purification of Carbon.." Yamamoto et al, J. Phys. D. Appl. Phys. 31 (1998) L. 34-L36.
"Spinning Continuous Carbon Nanotube Yarns" Nature, vol. 419, Oct. 24, 2002.
"Surface Sustained Permanent Gratings in Nematic Liquid.." Lee et al, Opticsl Express, vol. 10, No. 11, Jun. 3, 2002.
"Nonlinear Optical Transmission in VOX.." Xu et al, Applied Physics Letters. vol. 81, No. 9, Aug. 26, 2002.
"Cabon Nanotube Scanning Probe.." Nguyen et al, Applied Physics Letters, vol. 81, No. 5, Jul. 29, 2002.

*Primary Examiner*—Timothy Thompson
(74) *Attorney, Agent, or Firm*—Michael E. Belk

(57) ABSTRACT

An optical diffraction element (1) comprises a diffraction layer (4) which is divided into diffraction strips (6) alternating with intermediate strips (8). The diffraction strips comprise nano-elements (10) which are aligned in one direction and absorb radiation (b) which is linearly polarized in this direction. The diffraction element may be a linear or two-dimensional grating (1) or a Fresnel lens (160). The polarization-sensitive grating can be used in optical systems in which only radiation with a specific polarization direction should be diffracted, or in an optical record carrier to allow reading of an information structure with high spatial frequencies.

25 Claims, 7 Drawing Sheets

OPTICAL DIFFRACTION ELEMENT

The invention relates to an optical diffraction element comprising a diffraction layer which is divided into diffraction strips which alternate with intermediate strips.

The invention also relates to a method of manufacturing such a diffraction element, to an optical record carrier reading device provided with such an element, and to an optical record carrier provided with such an element.

A well-known diffraction element is an optical diffraction grating, wherein the diffraction strips are the grating strips. Diffraction gratings are widely used in the optical field, either as stand-alone elements or integrated with other optical components. A diffraction grating splits an incident beam into a, non-deflected, zero-order sub-beam, a pair of deflected first-order sub-beams, and pairs of sub-beams which are deflected in higher diffraction orders. There are two main types diffraction gratings: amplitude gratings and phase gratings, both of which may be reflective or transmissive. An amplitude grating comprises grating strips which absorb incident radiation, whilst the intermediate strips transmit or reflect incident radiation. A phase grating introduces a phase, or optical path length, difference between beam portions incident on grating strips and beam portions incident on intermediate strips, because the grating strips have a refraction coefficient or are situated at a level other than that of the intermediate strips.

In view of new applications, for example in miniaturized optical devices or in optical recording technology, there is a steady demand for diffraction gratings having an ever decreasing grating period. Grating period, or grating pitch, is understood to be the sum of the width of a grating strip and the width of an intermediate strip. The manufacture of gratings with small pitches, in the micron range, by conventional techniques, such as by means of electron beam writing and lithographic techniques, is very expensive so that such grating are costly elements.

It is an object of the invention to provide a new type of diffraction element such as a grating, which element shows a high contrast, can be manufactured in an easy and cheap way and thus is a cheap component. This diffraction element is characterized in that the diffraction strips comprise nano-element tubes which are embedded in the diffraction layer and all have their symmetry axes substantially aligned in one direction.

Substantially aligned in one direction is understood to mean that in principle the symmetry axes of all elements have the same, said one-, direction, but that small deviations from this one direction are possible without affecting the grating behavior. In the case of a linear diffraction grating, said direction is parallel to or perpendicular to the direction of the grating strips. The diffraction element may also be a two-dimensional grating having a first set of grating strips extending in a first (X-) direction and a second set of grating strips extending in a second (Y-) direction perpendicular to the first direction. The grating strips of a linear or two-dimensional grating may also extend in a direction or directions diagonal to the X- and Y-direction. The diffraction strips may also be annular strips, and the diffraction element comprising such strips may constitute a diffraction lens, for example a Fresnel zone lens.

Nano-element is a general term for nanotubes and nanowires, which are also called whiskers, and small prisms. Nano-elements are very small bodies having a more or less hollow (nanotubes) or filled (nanowires) cylindrical or prismatic shape having a smallest dimension, for example a diameter, in the nanometer range. These bodies have a symmetry axis, the orientation of which determines electrical and optical properties, such as the absorption characteristics of the material in which they are embedded. When reference is made hereinafter to their orientation, this relates to the orientation of their central cylinder axis or prism axis.

Nano-elements have been described for a variety of materials, such as:
  indium phosphide (InP) (X Duan et al., Nature 409 (2001), 66: J. Wang et al., Science 293 (2001), 11455–1457;
  zinc oxide (ZnO) (M. Huang et al, Science 292 (2001), 1897–1899;
  gallium arsenide (GaAs) and gallium phosphide (GaP) (K. Haraguchi et al., Appl. Phys., Lett. 60 (1992), 745: X. Duan et al., Nature 409 (201), 66;
  silicon carbide (SiC) (S. Motojima et l, J. Crystal Growth 158 (1996), 78–83;
  silicon (Si) (B. Li et al., Physical Review B 59, 3 (1999) 1645);
  boron nitride (BN) (W. Han et al., Applied Physics Letters 73, 21 (1998) 3085);
  nickel dichloride ($NiCl_2$) (Y. Rosenfeld Haconen et al., Nature 395 (1998) 336;
  molybdenum disulphide ($MoS_2$) (M. Remskar et al., Surface reviews and letters, vol. 5 no. 1 (1998) 423;
  tungsten disulphide ($WS_2$) (R. Tenne et al., Nature 360 (1992) 444, and
  carbon (C) (Iijima, S., Nature 354 (1991), 56–58, Ebbesen T. W. and Ajayan P.M. Nature 358 (1992), 220).

Carbon nanotubes have been particularly well studied. They are one-layer or multi-layer cylindrical carbon structures of basically graphitic (sp2-) configured carbon. The existence of both metallic and semiconducting nanotubes has been confirmed experimentally. Furthermore, it has recently been found that single-walled carbon nanotubes having a thickness of, for example, 4-ångström aligned in channels of an $ALPO_4$-5 single crystal exhibit optical anisotropy. Carbon nanotubes are almost transparent to radiation having a wavelength in the range of 1.5 μm down to 200 nm and having a polarization direction perpendicular to the tube axis. They show a strong absorption for radiation having a wavelength in the range of 600 nm down to at least 200 nm and having a polarization direction parallel to the tube axis (Li Z. M. et al., Phys. Rev. Lett. 87 (2001), 1277401–1-127401–4).

Similar properties have been found for nanotubes (or nanowires) other than those consisting of carbon. Nanotubes therefore most conveniently combine the following features. They absorb radiation in a broad range of wavelengths depending on the orientation of the nanotubes relative to the polarization direction of said radiation, and the orientation of the nanotubes can be directed and/or stabilized mechanically and/or by an electric field.

A configuration of linear strips, which comprise nano-elements all having their symmetry axes aligned, i.e. in the same direction, which strips alternate with intermediate strips, thus acts as an amplitude grating for linearly polarized radiation having its polarization direction parallel to the alignment direction, because the intermediate strips are transparent to this radiation.

In the paper "Spinning continuous carbon nanotube yarns" in Nature, Vol. 419, 24 Jan. 2002, page 801, which paper describes how carbon nanotubes can be self-assembled into yarns of up to 30 cm in length simply by being drawn out from superaligned arrays of such tubes, it is noted that a CNT polarizer can be constructed by parallel arrangement such CNT yarns. This paper thus discloses the polarizing properties of a specific structure of carbon nanotubes, but does not disclose a diffraction grating having grating strips formed out of such nanotubes.

A grating comprising carbon nanotubes is described in the paper: "Surface sustained permanent gratings in nematic liquid crystals doped with carbon nanotubes" in Optics Express vol. 10, no. 11, 2002, pages 482–487. However, this grating is a refractive index grating, or phase grating. It comprises a layer of nematic liquid crystal which is doped with multiwalled carbon nanotubes. A grating is formed in this layer in a holographic way, i.e. by means of two interfering beams. These beams cause a periodic redistribution of the doping material at the interface between the LC layer and an aligning layer. The radiation-absorbing nanotubes act as traps of radiation-induced surface charges, cause the radiation-induced modulation of the easy axis in the LC bulk, and sustain the permanent grating through the continuum effect of the liquid crystal material. It is remarked in the paper that there may a polarization dependency, but this is coupled to the re-orientation of the LC and not attributed to the carbon nanotubes. This grating is principally a LC grating, wherein the nanotubes are auxiliary means, and thus is of a different type than the grating according to the invention, wherein the aligned nano-element tubes only provide the grating function.

Nano-element tubes are very small in one dimension; for example, carbon nanotubes may have a width of 0.3 nm up to approximately 100 nm. These elements can thus be packed to a great density and their size is not a main limiting factor for the width of the grating strips and thus the pitch of the diffraction grating.

As the different types of nano-element tubes show similar absorbing properties, the diffraction element according to the invention may comprise different types of nano-element tubes on the understanding that one diffraction element comprises only one type of nano-element tubes.

A first embodiment of the diffraction element is characterized in that the nano-element tubes are nanowires.

A second and preferred embodiment of the diffraction element is characterized in that the nano-element tubes are nanotubes.

Nanotubes, and especially carbon nanotubes, provide a very large contrast between perpendicularly radiation polarized and parallel polarized radiation with respect to the tube direction, i.e. to the axis of anisotropy. For example, an absorption contrast (expressed in terms of optical density: OD) of 4–8 OD can be obtained for incident radiation having a wavelength of 405 nm. Furthermore, a useful diffraction element can already be obtained with small concentrations of nanotubes in a transparent layer.

In addition, nanotubes per se are cheap, lightweight and easy to manufacture and to recycle. By including nanotubes in a transparent medium to obtain a diffraction element, these advantages are transferred to this medium and to the diffraction element.

Nanotubes are also very stable and do not readily decay or racemize under every day conditions of diffraction elements. Once produced a pattern of nanotubes is thus also very stable and does not readily decay.

A further preferred embodiment of the diffraction element is characterized in that the nanotubes are carbon nanotubes, especially single-wall carbon nanotubes.

Single-wall nanotubes, especially single-wall carbon nanotubes exhibit a particularly pronounced anisotropy, enhancing the advantages inherent in the diffraction element of the invention.

The diffraction element may be a transmission element or a reflective element. For a transmission element, it is not only the diffraction layer but also the substrate carrying the diffraction layer that is transparent. A reflective diffraction element can be obtained by covering the transparent diffraction layer with a reflective layer, i.e. by arranging a reflective layer between the diffraction layer and the substrate, which may or may be not be transparent. The substrate may also be formed by another optical element of an optical device of which the diffraction element forms part.

A particularly preferred embodiment of the diffraction element is characterized in that the diffraction layer is essentially solid at temperatures below 30° C.

Such a diffraction element shows an enhanced stability of the orientation of the nano-elements. These elements are thus in effect frozen and prevented from accidentally changing their orientation. To obtain said solidity, a transparent material that is essential solid at temperatures below 30° C. may be used for the diffraction layer. The solidity may also be achieved by placing the nanotubes on top of a solid surface and affixing the nanotubes to the solid surface by means of van der Waals forces or glue. Within the scope of this invention, a diffraction layer is considered to be essentially solid if the viscosity of the layer at and below 30° C. is at least 10 Pa s (100 poise), more preferably higher than 20 PS s, even more preferably higher than 50 Pa s (500 poise). At viscosities lower than 10 Pa s the grating layer can be considered as being essentially liquefied. Preferably, the diffraction layer is essentially solid up to temperatures of 80° C., more preferably up to temperatures of 100° C. This enhances the stability of the orientation of the nanotubes during normal conditions of use of a diffraction element.

Preferably, the diffraction element is characterized in that the material of the diffraction layer is liquefiable at temperatures below the temperature at which the nano-element tubes get destroyed.

The diffraction layer can then be liquefied by decreasing the viscosity of the layer if this layer is solid otherwise. It is therefore not necessary to liquefy or otherwise change the structural integrity of the nanotubes in the diffraction layer. Generally, nanotubes can withstand temperatures of 100° C.; carbon nanotubes, for example, are destroyed at 800–1000° C. Liquefaction allows to reorient the nanotubes of a liquefied diffraction layer.

The diffraction element may be further characterized in that the material of the diffraction layer is selected from the group consisting of glasses with melting or glass temperatures below 800° C., acrylic thermoplastics, and paraffins.

Such transparent materials render it possible to realize diffraction layers that are essentially solid at temperatures below 30° C. They also render it possible to realize diffraction layers that are liquefiable at temperatures at which the nanotubes (especially carbon nanotubes) are not substantially destroyed and that can be re-solidified after such liquefaction.

The main application of the invention is the use of the diffraction structure in a linear or two-dimensional grating wherein the advantages of the invention are optimally used. The invention may also be used in other diffraction elements, such as a Fresnel lens.

The invention also relates to methods of manufacturing the diffraction element described above.

A first method is characterized by the steps of:
  printing a pattern of strips comprising a solution containing nano-element tubes;
  aligning the nano-element tubes in a required direction by means of an electrical or magnetic aligning field, and fixing the orientation of the nano-element tubes in said direction by treating the solution in the presence of the aligning field.

The treatment may consist of evaporating the solution so that the nano-elements remain as isolated elements, or of polymerizing the solution, i.e. solidifying the solution. The aligning field may be a magnetic field or an AC or DC electric field; preferably it is an AC electric field.

The paper "Orientation and purification of carbon nanotubes using ac electrophoresis" in J. Phys. D; Appl. Phys. 31 (1998) L34–L36 describes how nanotubes can be oriented by means of electrophoresis. If an AC electrical field is applied, nanotubes will move to the electrodes and be oriented the degree of orientation increasing with an increasing frequency of the electric field. The paper does not disclose a diffraction grating based on nanotubes. For the manufacture of such a grating it is important that the electrical field remains present during fixation of the orientation of the nanotubes.

A second method of manufacturing the diffraction element is characterized by the steps of:
  spin-coating a surface area of a substrate with a thin film of a solution containing nano-element tubes;
  aligning the nano-element tubes in a required direction by means of an electric or magnetic aligning field;
  fixing the orientation of the nano-element tubes in said direction by treating the solution in the presence of the aligning field, and
  baking out strip-shaped areas of the film, thereby obtaining a pattern of strips comprising aligned nano-element tubes, which strips form the diffraction strips.

Baking out may be performed by exposing the solution to radiation of sufficient energy via a mask having a pattern of transparent and non-transparent strips corresponding to the grating pattern. Baking out may alternatively be performed by scanning a sufficiently intense radiation beam strip-wise across the solution. In both cases a pattern of strips comprising aligned nano-elements remains, which strips form the diffraction strips. The radiation used for baking out should having an energy which renders possible a removal of strips of the film in a reactive environment. For carbon nanotubes this environment may be an oxygen-containing environment. It should be prevented that the strips show a height difference of $\lambda/4$ with the intermediate strips after burning-out, because a polarization-insensitive phase grating would be obtained then. If necessary, the intermediate strips can be filled with film material that does not comprise nano-element tubes to avoid formation of a phase grating.

A third method of manufacturing the diffraction element is characterized by the steps of:
  coating a substrate area with a layer of self-assembled material;
  strip-wise modifying the material of the layer so that a pattern of strips, which wet to the substrate surface, is obtained and removing the rest of the layer material;
  spin-coating a liquid containing nano-element tubes over the pattern thus obtained, such that the liquid wets only the bare substrate so that a pattern of liquid strips containing nano-elements tubes is obtained;
  aligning the nano-elements tubes in the liquid strips in a required direction by means of an electric or magnetic aligning field, and
  fixing the orientation of the nano-element tubes in said direction by treating the liquid in the presence of the aligning field, thereby obtaining a pattern of strips containing aligned nano-element tubes, which form the diffraction strips.

Strip-wise modifying of the material of the layer can be performed by scanning the layer strip-wise by, for example, an electron beam or by exposing the layer to, for example, UV radiation via a mask having a pattern of transparent slits corresponding to the grating pattern of slits. The E beam or radiation destroys the molecules or functional groups of the layer material, which results in a modified wetting behavior of the material in the illuminated strips. It is also possible to use a microcontact printing process. The advantage of such a process is that it can change the local orientation. The grating strips and intermediate strips need not be of the same material, but may consist of different materials like silicone nitride and PMMA (polymethyl methacrylate).

A fourth method of manufacturing the diffraction element is characterized by catalytic growing of nano-elements on a substrate surface from a layer, which has been deposited on the substrate and which comprises nano-element material, and by baking-out of strip-shaped areas of the layer, thereby obtaining a pattern of strips comprising aligned nano-elements, which strips form the diffraction strips.

Baking out of strips may be performed in the same way as described for the second method. The layer may be a thin metal layer, which may be deposited on the substrate by means of chemical vapor deposition (CVD) or vapor liquid solidification (VLS). Upon heating, this layer is broken up into small spheres, which are quasi-liquid. The lower sides of the spheres crystallize on the substrate and adhere thereto under the influence of catalyzing elements present in the layer, for example Fe particles in the case of carbon nanotubes.

In general, the above-described processes for producing a layer of nano-elements are known per se, as well as other methods which may be used. However, the above-described methods of producing a diffraction grating or a diffraction element in general are new.

In a number of applications or optical devices, the diffraction grating according to the invention can replace a conventional diffraction grating, such as a grating manufactured by a lithographic technique, by a replication technique, or by means of interfering beams (holographically). The new diffraction grating may be used, for example, for beam splitting, for beam deflection, etc. As the diffraction grating is polarization-sensitive, it is very suitable for use in situations where it should be effective for a first beam and non-effective for a second beam. These beams should have mutually perpendicular polarization directions, one of which corresponds to the direction of alignment of the nano-elements. Such a situation occurs in a device for recording and reading optical record carriers, which device is a compatible device, i.e. it is capable of recording and reading optical discs of different formats, such as CD, DVD, and Blue Ray discs.

An advantageous and inventive application of the diffraction grating is also found in the field of optical recording, namely for increasing the density of the information structure, or decreasing the size of the information details, which information can be read out satisfactorily by a read device. Co-pending EP application 03100817.0 discloses that a device designed for reading a record carrier having a given (conventional) information density can be used for reading a record carrier having a substantially higher (super) information density if the information layer of the latter record carrier is provided with a diffraction grating. As will be explained hereinafter, if the diffraction grating is a grating according to the invention, the same device is capable of reading information having a conventional density and information having the super density. In this way the invention also solves the information density problem in optical recording technology, so that a record carrier provided with a diffraction grating as described above also forms part of the invention.

The invention also relates to a device for reading and recording an optical information carrier of a first type having a first information density and an optical information carrier of a second type having a second information density, which device comprises a radiation source unit supplying a first radiation beam having a first wavelength for co-operating with the first type of information carrier and a second radiation beam having a second wavelength for co-operating with the second type of record carrier, and an objective system for focusing the first and the second beam on an information layer of the first and the second type record carrier, respectively. This device is characterized in that a diffraction grating as described above is arranged between the radiation source unit and the objective system in the common radiation path of the first and the second radiation beam, and in that one of the radiation beams has a first polarization direction parallel to the direction of the nano-elements in the grating, whilst the other beam has a polarization direction perpendicular to the first polarization direction.

This device utilizes the property of the novel diffraction grating that is acts as a grating only for a linearly polarized radiation beam having its polarization direction parallel to the orientation of the nano-elements in the diffraction grating and is ineffective for a radiation beam having a perpendicular polarization direction. The two beams can be optimized for the associated type of record carrier by means of the diffraction grating.

These and other aspects of the invention will be apparent from and elucidated by way of non-limitative example with reference to the embodiments of a diffraction grating described hereinafter and illustrated in the accompanying drawings. In the drawings.

Figure 1A:
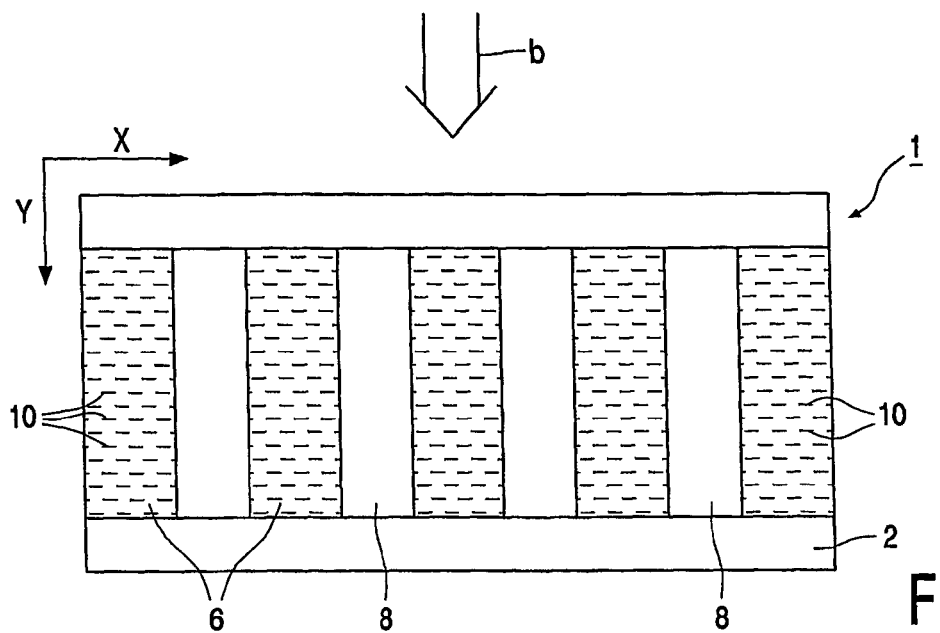
FIGS. 1a and 1b show a top view and a cross-section, respectively, of a portion of a first embodiment of the diffraction grating according to the invention.
Figure 1B:
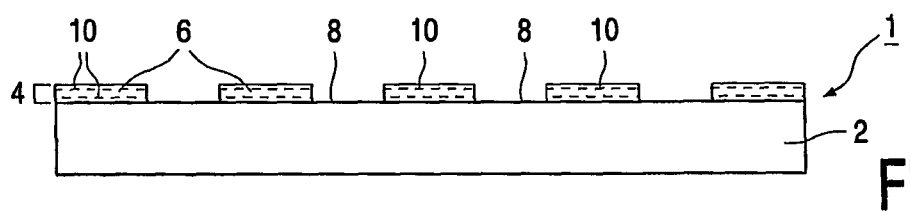

As is shown in FIGS. 1a and 1b, the diffraction grating comprises a substrate 2 and a diffraction layer 4. The diffraction layer is divided into a number of grating strips 6 which alternate with intermediate strips 8. The grating strips comprise a large number of very small nano-element tubes 10, such as cylindrically or prismatically shaped filled nanowires, or preferably hollow nanotubes, and more preferably carbon nanotubes. These elements have an axis of symmetry the orientation of which determines the optical properties, i.e. the absorption of the material in which they are embedded. The carbon nanotubes have a diameter of the order of 10 ångström and a length of the order of 10 µm. In the embodiment of FIGS. 1a and 1b, the nanotubes have their symmetry axes oriented in the X-direction, i.e. they are aligned in the X-direction. As a consequence the grating strips will absorb a beam b of linearly polarized radiation which has its polarization direction, i.e. the direction of the E-vector of the electromagnetic radiation, in the X-direction. The beam portions incident on the intermediate strips 8 where no nanotubes are present will pass the grating layer 4 and the substrate if the latter is transparent. The configuration of the strips comprising nanotubes and the intermediate strips, which are not provided with nanotubes, thus acts as an amplitude grating for radiation which is linearly polarized in the X-direction. The grating strips will not absorb radiation which is polarized in the Y-direction, so that the grating structure is "invisible" to such radiation and element 1 forms a transparent plate for this.

Figure 2A:
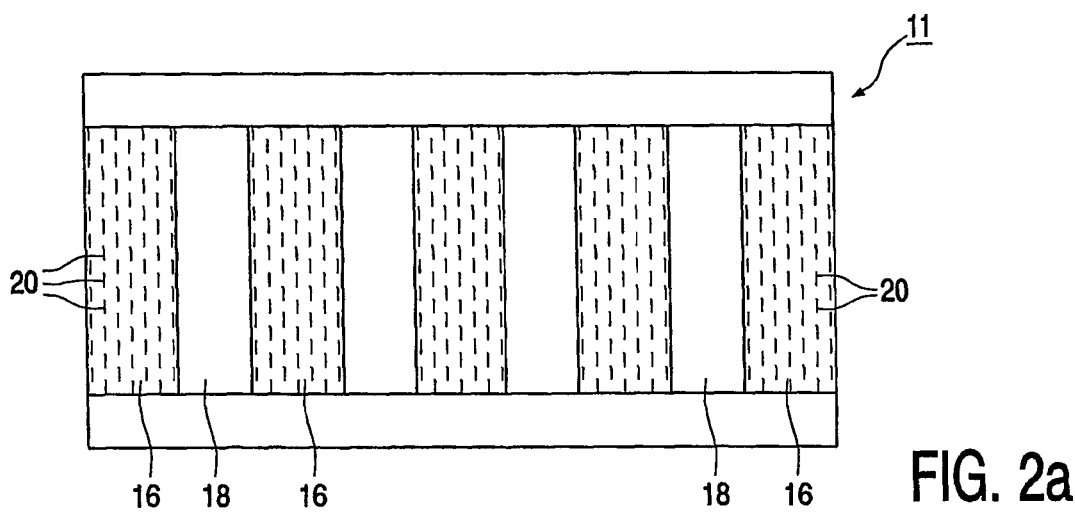
FIGS. 2a and 2b show such views of a second embodiment of such a diffraction grating.
Figure 2B:
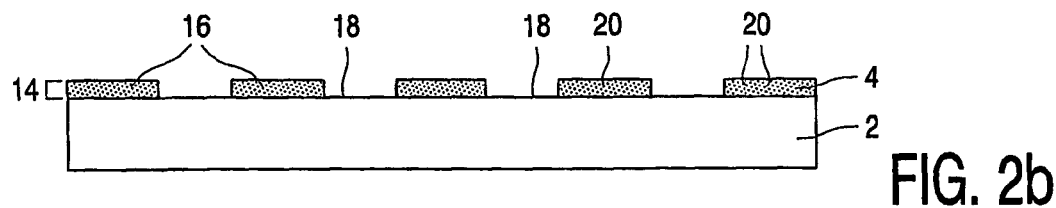

FIGS. 2a and 2b show an embodiment of a diffraction grating 11 where the grating strips 16 are provided with nanotubes which are aligned in the Y-direction. These strips will absorb radiation that is linearly polarized in the Y-direction so that this grating acts as an amplitude grating for this type of radiation. The element 11 forms a transparent plate radiation that is linearly polarized in the X-direction.

FIGS. 1a, 1b and FIGS. 2a, 2b show only a small number of grating strips and intermediate strips. In reality this number is much larger. The pitch, or spatial period, P of the grating is, for example, of the order of 1 micron or smaller, but greater than 200 nm if the nano-elements are carbon nanotubes. The diffraction grating of FIGS. 1a, 1b or of FIGS. 2a, 2b may be a stand-alone element, the diffraction layer then being carried by a proper substrate. The diffraction grating may also be integrated with another element of the optical device in which the diffraction grating should be included. This has the advantage that the optical device can be more compact, requires less alignment, and false reflection at a separate substrate is avoided.

The diffraction grating may also be a reflective grating instead of a transmission grating. In that case the substrate is reflective or a reflective layer is inserted between the diffraction layer and the substrate. The radiation incident on a diffraction grating passes the diffraction layer twice, which means that radiation portions incident on the grating strips are absorbed twice, so that the contrast between the grating strips and the intermediate strips is increased.

There are several methods of manufacturing the novel diffraction element, which will be described hereinafter with reference of a diffraction grating.

Figure 3A:
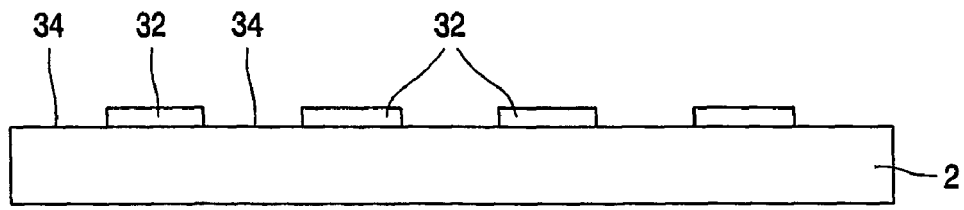
FIGS. 3a–3c show individual steps of a first method of manufacturing such a diffraction grating.
Figure 3B:
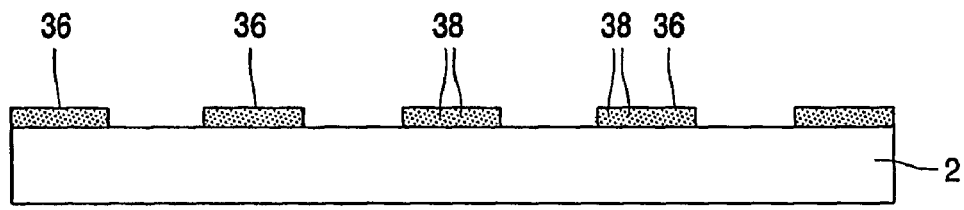
Figure 3C:
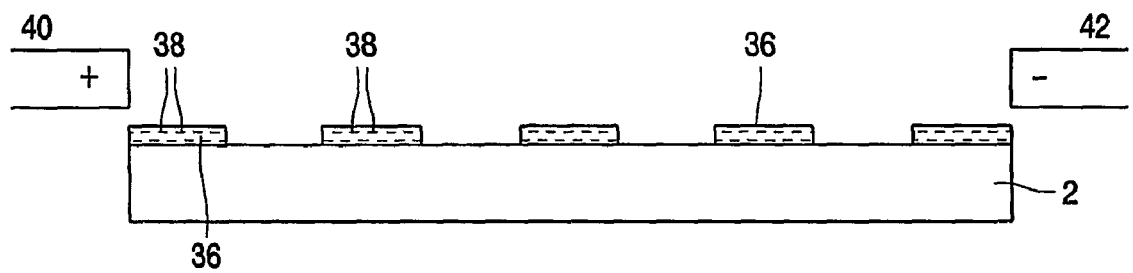
Figure 4A:
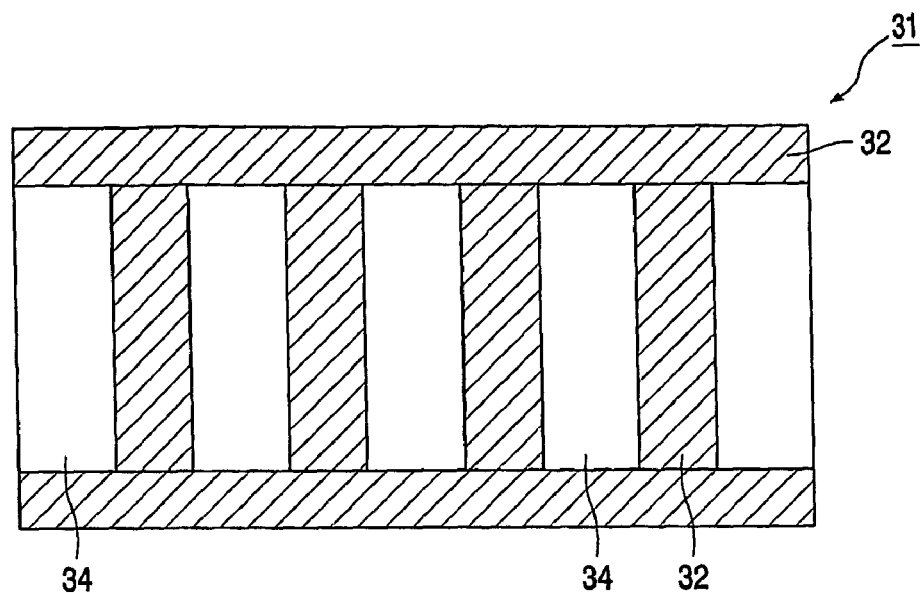
FIG. 4a shows the mask used in the first of these steps.
Figure 4B:
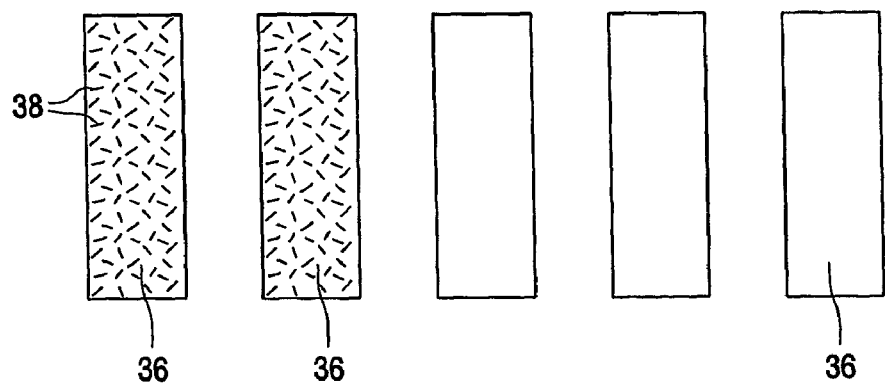
FIGS. 4b and 4c show the result of the second and third step in a top view.
Figure 4C:
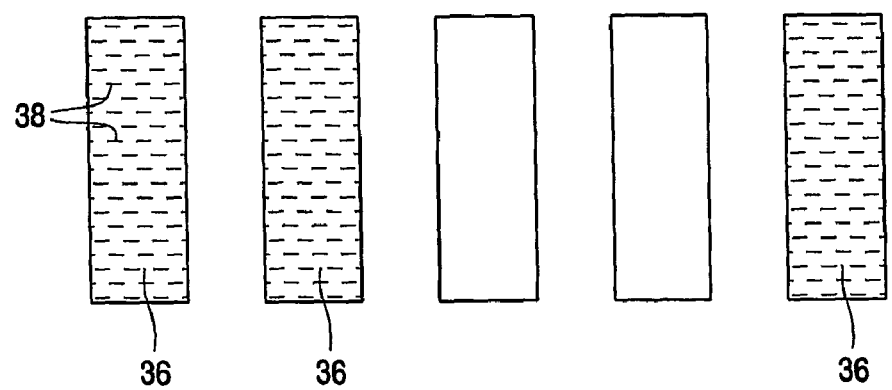

According to a first method, a pattern of strips is printed on a substrate by means of a contact printing technique. This method is schematically illustrated in FIGS. 3a–3c and in FIGS. 4a–4c. As shown in FIG. 3a, a grid 30, which comprises a plate 32 with slits 34, is placed on a substrate 2. FIG. 4a shows a top view of the grid 30. A solution containing nano-elements, for example nanotubes, is sprayed over the grid so that the solution reaches the substrate via the slits. As a result, strips of solution 36 are formed on the substrate in the positions of the slits 34, as shown in FIG. 3b. A top view of the strips of solution is shown in FIG. 4b. The nano-elements 38 in the solution strips 36 show a random distribution of their orientation. In the next step, an AC electric aligning field is applied across the solution pattern, which is illustrated in FIG. 3c by means of electrodes 40 and 42. An electrophoresis process as described in the paper: "Orientation and purification of carbon nanotubes using ac electrophoresis" in J. Phys D: Appl. Phys. 31 (1998), L34–L36, serves to align the nano-elements, i.e. they are all oriented in the same direction, which is the direction of the electric field. The solution pattern with aligned nano-elements is shown in FIG. 4c. Instead of an AC field, a DC electric field may also be used. It also possible to align the nano-elements by means of a magnetic field.

As a last step, the orientation of the nano-elements is fixed, or "frozen". This can be realized in different ways, depending on the type of solution. For example, the solution may be evaporated so that only nano-elements adhering to the substrate by Van der Waals forces will remain. If the solution is a liquid polymer, the nano-elements can be frozen by polymerization of the solution. The electric field is maintained until all nano-elements have been aligned and the manufacture has been completed.

Figure 5A:
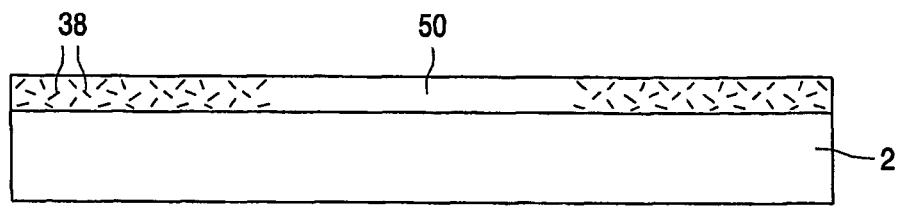
FIGS. 5a–5c show individual steps of a second method of manufacturing such diffraction grating.
Figure 5B:
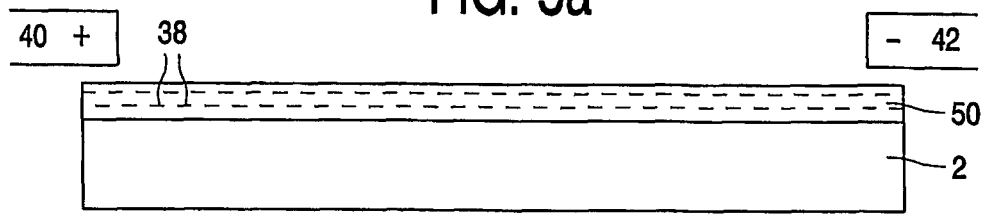
Figure 5C:
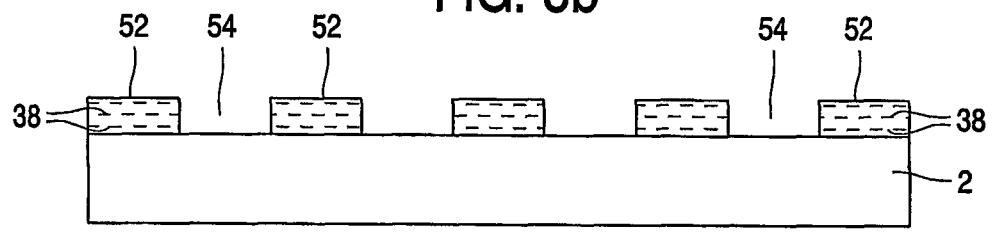

FIGS. 5a–5c show a second method of manufacturing the diffraction grating. In a first step, a substrate area having the size of the grating to be formed is covered with a thin film of a solution containing nano-elements, as shown in FIG. 5a. In a second step, the nano-elements 38 of the whole film are aligned electrophoretically by means of an AC electric aligning field, as indicated by the electrodes 40 and 42 in FIG. 5b. Again, a DC electric or a magnetic aligning field may alternatively be used.

The orientation of the nano-elements is subsequently frozen, for example by polymerization if the film is a liquid polymer film. Then strips of the film are removed by local baking, for example by exposing the film to high-intensity radiation via a mask having a pattern of transparent slits corresponding to the intermediate strips of the grating to be formed. This results in a pattern of film strips comprising aligned nano-elements as shown in FIG. 5c, which strips form the grating strips.

Figure 6A:
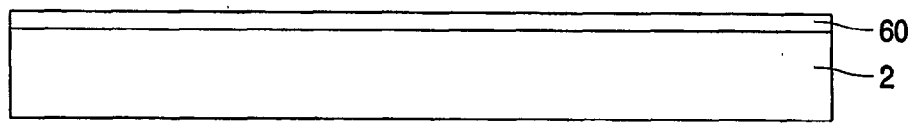
FIGS. 6a–6c show individual steps of a third method of manufacturing such a diffraction grating.
Figure 6B:
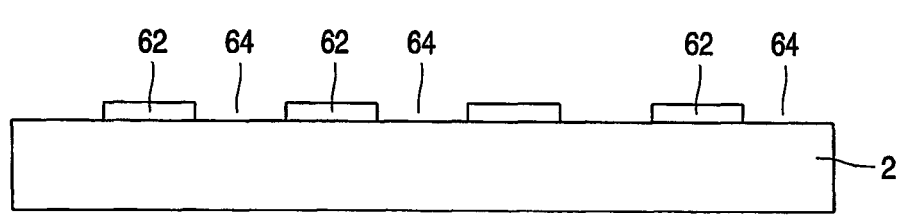
Figure 6C:
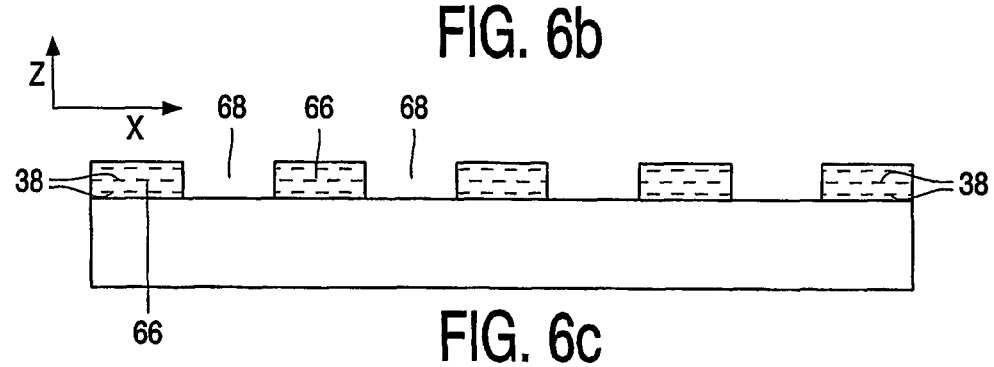

A third method of manufacturing the diffraction grating is illustrated in FIGS. 6a–6. This method uses a self-assembled monolayer (SAM) 60, which is coated on a substrate 2, as shown in FIG. 6a. The materials of the SAM and of the substrate are chosen such that the SAM wets the substrate. For example, the SAM is hydrophobic and the substrate is hydrophilic. The SAM is exposed strip-wise to actinic radiation, i.e. radiation that attacks the SAM material. The actinic radiation may be a charged-particles beam, such as an electron beam, or electromagnetic UV radiation which passes through a mask having a pattern corresponding to the pattern of the grating to be produced As a result of the exposure, the molecules or functional groups of the SAM material within the strips are destroyed or modified such that the material no longer wets the substrate and can be removed. Thus a pattern of SAM strips 62 alternating with SAM-less strips 64 is obtained, as shown in FIG. 6b. This pattern is covered with a liquid containing nano-elements 38, for example by means of spin coating. The liquid is chosen such that it wets only a hydrophilic surface, i.e. only the SAM-less strips 64 of the substrate surface. The liquid on the SAM strips is removed as well as the SAM strips themselves. The nano-elements in the liquid strips are aligned by means an aligning field, for example an AC electric field, whereby the orientation of the nano-elements is frozen. A structure of strips 66 comprising aligned nano-elements, which strips alternate with empty strips 68, is thus obtained in which the strips constitute absorbing grating strips.

A fourth method of manufacturing the diffraction element is based on catalytic growth of nano-elements on a substrate surface. First a layer comprising nano-element material is deposited on the surface. Then strip-shaped areas of the layer are baked out, whereby a pattern of strips comprising aligned nano-elements is obtained, which strips form the diffraction strips.

Baking out of strips may be performed in the same way as described for the second method. The layer may be a thin metal layer, which may be deposited on the substrate by means of chemical vapor deposition (CVD) or vapor liquid solidification (VLS). Upon heating, this layer is broken up into small spheres, which are quasi-liquid. The lower sides of the spheres crystallize on the substrate and adhere thereto under the influence of catalyzing elements present in the layer, for example Fe particles in the case of carbon nanotubes.

In general, the above processes for producing a layer of nano-elements are known per se, as well as other methods that may be used. However, the methods described of above producing a diffraction grating or a diffraction element in general are new.

The structure on which the grating structure is formed may be a discrete substrate, and the manufactured grating then is a discrete grating. The substrate may also be an optical element of the device in which the grating is to be included, in which case the manufactured grating will be integrated with said element.

The novel grating can replace a conventional amplitude or phase grating and has the advantages that it is easy and cheap to manufacture and that it shows a high contrast between the grating strips and the intermediate strips. The capabilities of the grating can be optimally used in an optical system or device in which two radiation beams are used that follow the same radiation path, whilst only one of the beams should undergo diffraction and the other should not. This can be achieved by arranging the novel diffraction grating in the common radiation path and using two beams having mutually perpendicular polarization directions, one of which is parallel to the orientation of the nano-elements in the grating strips.

An example of such an apparatus is a device for reading and recording an optical information carrier of a first type having a first information density and an optical information carrier of a second type having a second information density, which device comprises a radiation source unit supplying a first radiation beam having a first wavelength for cooperating with the first type of information carrier and a second radiation beam having a second wavelength for cooperating with the second type of record carrier, and an objective system for focusing the first and the second beam on an information layer of the first and the second type of record carrier, respectively.

The pending EP patent application 02079098.6 (PHNL020985) describes an optical scanning device for scanning a first record carrier having a first, HD, information layer in a first mode of operation and for scanning a second type of record carrier having a second, LD, information layer in a second mode of operation, which device comprises a first and a second diffraction grating for splitting the LD scanning beam and the HD scanning beam, into a main beam and two satellite beams, respectively.

HD stands for high density, and a high-density record carrier is, for example, a record carrier of the DVD (digital versatile disc) format. The HD scanning beam is the beam for recording and/or reading such a record carrier. LD stands for low density, and a low-density record carrier is, for example, a record carrier of the CD (compact disc) format. The LD scanning beam is the beam for recording and/or reading such a record carrier. The HD beam has a smaller wavelength, for example 650 nm, than the LD beam, for example 780 nm, so that a same objective system will focus a HD beam into a smaller scanning spot than a LD beam.

Figure 7:
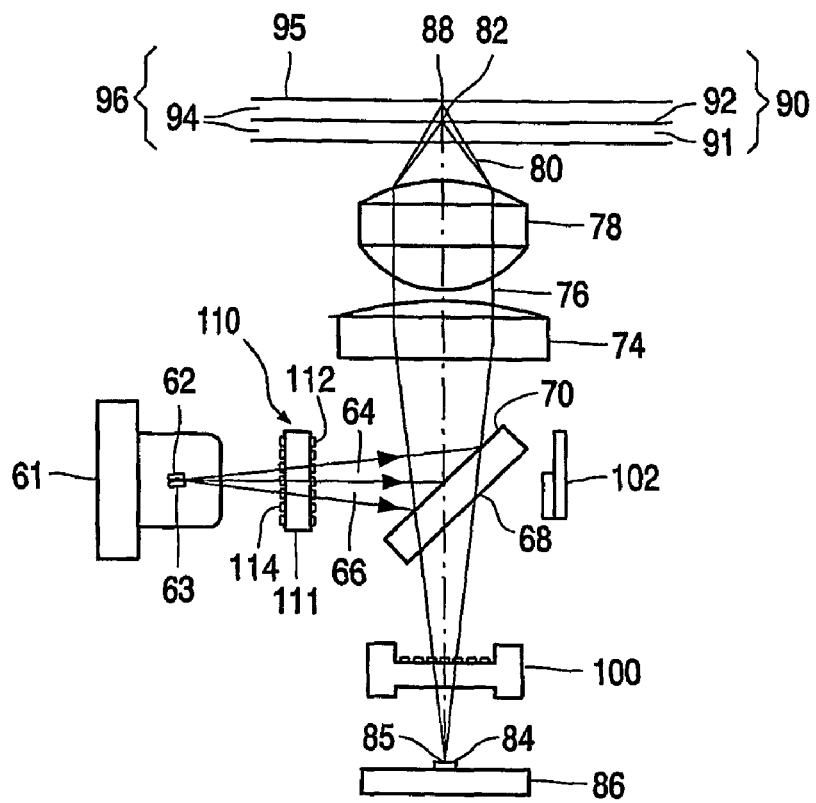
FIG. 7 shows an embodiment of a device for reading two types of optical record carriers in which a diffraction grating according to the invention is used.

FIG. 7, which is reproduced from EP patent application 02079098.6, shows an embodiment of said recording/reading device, which is also called combination player. The optical path of the device comprises a radiation source 61 in the form of a two-wavelength diode laser package. A two-wavelength diode laser package is a composed semiconductor module which has two elements 62,63 emitting radiation beams 64, 66 at different wavelengths. This module may comprise a single diode laser chip having two emitting elements or two diode laser chips arranged in one package. Although the distance between the emitting elements is made as small as possible, the chief rays of the beams 64, 66 do not coincide. Nevertheless, FIG. 7 shows HD beam 64 and LD beam 66 as a single radiation beam for the sake of clarity. As the device should the capable of recording a HD record carrier and a LD record carrier, the element 62 should emit high-power red (HD) radiation and the element 63 should emit high-power infrared (LD) radiation.

Beam 64 emitted by the two-wavelength laser is incident on a beam splitter 68, for example a plane transparent plate arranged at an angle of, for example, 45°, with respect to the chief ray of the beam. Plate 68 is provided with a, for example semitransparent, reflective surface 70, which reflects the beam to a collimator lens 74. This lens converts the divergent beam into a collimated beam 76. This beam passes through an objective lens system 78, which changes collimated beam 76 to a convergent beam 80 for scanning a record carrier 90. The objective lens system may consist of a single lens element, or it may comprise two or more lens elements, such as shown in FIG. 7.

The record carrier to be scanned by means of the HD beam 64 is of a first, high-density type and comprises a transparent layer 91 having a thickness of e.g. 0.6 mm and an information layer 92, onto which converging beam 80 is focused in a scanning spot 82. The radiation reflected from information layer 92 returns along the optical path of beams 80 and 76, passes the beam splitter 68 and is converged by collimator lens 74 to a detector spot 84 on a radiation-sensitive detection system 86. This system converts the beam into an electrical detector signal. An information signal representing information stored in information layer 92 and control signals for positioning focus 82 in a direction normal to the information layer 92 (focus control) and in a direction normal to the track direction (tracking control) can be derived from the detector signal.

LD beam 66 for scanning the second type of record carrier 96 propagates along the same path as HD beam 64 towards this record carrier, which comprises a substrate 94 having a thickness of e.g. 1.2 mm and a low-density information layer 95.

Record carriers 90 and 96 are drawn as a single, two layer record carrier having a semi-transparent information layer 92, but they may alternatively be separate single-layer record carriers having transparent layers of different thickness.

The LD beam should be focused on a scanning spot 88 on the information layer 95. The objective system 78 is designed so as to operate in a first mode at a first set of conjugates, whereby the HD beam from the emitting element 62 is focused on information layer 92. In the second mode, the objective system operates at a second set of conjugates, whereby the LD beam from the emitting element 63 is focused on information layer 95. Radiation reflected from information layer 95 returns along the path of the LD beam 80, 76, passes the beam splitter 68, and is converged by means of the objective lens system into a detector spot 85 on the radiation-sensitive detection system 86.

Between the beam splitter 68 and the detection system 86, a beam combining-element 100 may be arranged, which makes the chief ray of the HD beam and of the LD beam co axial so that the position of spot 84 coincides with the position of spot 85. This renders it possible to use the same detection system 86 for the HD beam and the LD beam used in the respective modes. The beam-combining element may be a wavelength-selective grating which diffracts one of the HD and LD beams and passes the other without diffracting it. Preferably, this grating is a blazed phase grating.

If the scanning device should be capable not only of reading but also of recording a HD record carrier, the laser package should comprise a high-power red radiation emitting element 62 instead of a low-power element, and a diffraction grating, denoted a three-spot grating, 110 should be arranged between the radiation source unit 61 and the beam splitter 68. This grating comprises a transparent substrate 111 and a grating structure 112. Currently such a scanning device comprises an additional detector 102 arranged at the rear side of the beam splitter 68. This detector supplies an output signal that is proportional to the intensity of the HD beam from element 62 and is used to control the intensity of the recording beam.

Grating 112 splits the incident HD beam into a non-deflected zero-order or main, sub-beam and plus and minus first-order sub-beams. For the sake of clarity, FIG. 7 shows only the main beam. The main sub-beam forms a main scanning spot on a track to be scanned in the information layer for the purpose of recording or reading this track. The first-order sub-beams form two satellite spots (not shown) in the information layer, which are shifted in opposite directions, skew to the track direction, with respect to the main spot. The satellite spots are imaged in additional detector spots (not shown) on the detection system 86, and separate detector elements for these spots are provided in this system. A track error signal, i.e. a signal comprising an indication about the deviation between the center of the main spot 82 and the center line of the track being scanned can be derived from the output signals of the separate detector elements. The track error signal can be used in a track servo system to keep the main spot on track. The generation of a track error signal and the relevant track servo system itself are well known in the art.

If the scanning device should be capable not only of reading, but also of recording a LD type record carrier, the laser package 61 should comprise a high-power infrared radiation emitting element 63 and a three-spot servo track system for the LD beam. A second diffraction grating 114 should also be arranged between the laser package 61 and the beam splitter 68. This grating should diffract only the LD beam and be a transparent plate for the HD beam, like the grating 112 being a transparent plate for the LD beam and diffracting only the HD beam. The gratings 112 and 114 may be separate elements, but preferably are integrated in a dual grating element 110 having a HD three-spot grating on one side and a LD three-spot diffraction grating 114 on the other side. The integration of gratings 112 and 114 in one component saves material and manufacturing costs as well as space in the scanning device. Moreover, the number of surfaces in the radiation path is reduced, so that the risk of false reflections occurring is reduced.

Each of the grating structures should provide a given ratio of radiation energy diffracted in the first orders to radiation energy in the zero order for the beam it should diffract and it should be "invisible" to the beam it should not diffract. As stated in EP patent application 02079098.6, the grating should have a duty cycle of 50%. The duty cycle is understood to be the ratio of the width of the grating strips to the pitch, or spatial frequency, of the grating structure. In the device of EP patent application 02079098.6, the selectivity of each grating for a different one of the two beams, HD and LD, is based on wavelength selectivity. The gratings are phase gratings, i.e. the grating strips are grooves in or ridges on the grating surface, and the selectivity is obtained by giving the grooves of the HD grating a smaller depth than the grooves for the LD grating.

According to the invention, said selectivity is obtained by using diffraction gratings whose grating strips comprise aligned nano-elements, wherein the orientation of the nano-elements in one grating is perpendicular to the orientation of the nano-elements in the other grating, and by using a linearly polarized HD beam having its polarization direction parallel to the nano-element orientation of one grating and a linearly polarized LD beam having its polarization direction parallel to the nano-element orientation of the other grating. In this way it is achieved that each beam is diffracted by a respective one of gratings, each grating showing a high contrast for the relevant beam.

A very advantageous use of the invention can also be made in optical recording technology, but for a quite different aspect, namely for reading a high information density record carrier by means of an optical reading device designed for reading a record carrier having a lower information density. As was discussed above, an objective system, currently an objective lens, comprising one or more lens element(s) focuses the read beam to a read spot on the information layer in such a reading device. Information is encoded in the succession of individual information areas, which alternate in the track direction with intermediate areas, in the record carrier. The size of the read spot is larger than the width of the individual information areas. These areas thus diffract the incident read beam, i.e. they split this beam into a non-deflected zero-order sub-beam and a number of deflected higher-order sub-beams. Current optical record carriers have a reflective information layer, and the zero-order sub-beam and portions of the two first-order sub-beams reflected by the information layer pass through the objective lens. This lens concentrates the radiation portions on a radiation-sensitive detection system, such that these radiation portions interfere with each other. During scanning of the information layer, the interference pattern formed on the detection system varies, and this system supplies an electrical signal which represents the information being read out.

If the information density in the information layer of an optical record carrier is to be increased, the size of the information areas and of the intermediate areas as well as the distance between the information tracks should be decreased. The reading of information areas with a decreased size requires, a read spot with a correspondingly decreased size; otherwise the information areas cannot be read separately. This means that the resolution of the reading device should be increased. The cut-off frequency of a conventional read device, i.e. the conventional cut-off frequency, is $2NA/\lambda$, wherein NA is the numerical aperture of the objective lens and $\lambda$ is the wavelength of the read beam. This means that an information structure having a spatial frequency up to $2NA/\lambda$ can be read out satisfactorily. For an information structure having a higher spatial frequency this is no longer possible. Increasing NA and/or decreasing $\lambda$ could increase the resolution of the read device and thus the spatial frequency of the information structure that still can be read. The fact that the depth of focus of the objective lens is proportional to $\lambda/(NA)^2$ sets a limit to the increase of NA, because the depth of focus will become too small for a large NA. Reading devices with sufficiently small read wavelength can be realized only when diode lasers emitting such small wavelengths become available.

As described in U.S. Pat. No. 4,242,579, the resolution can be increased in that the objective lens passes only portions of the zero-order sub beam and of only one of the first-order sub-beams of the reflected read beam to the detection system, and in that a detector is used which has a small dimension in the scan direction. To that end the read beam and the record carrier are tilted relative to each other, i.e. the read beam is not incident perpendicularly on the record carrier. In this way it is achieved that for higher spatial frequencies of the information areas first-order and zero-order radiation still passes the objective lens and interferes on the detection system so as to provide an information signal. The resolution can thus be increased to, for example, twice the conventional resolution. As the read beam has to pass the substrate of the record carrier and this substrate has a given thickness, for example 1.2 mm, to provide sufficient mechanical strength and dust protection, an amount of aberration, such as coma and astigmatism, is introduced into the read beam. This will result in a read spot in the information layer which is larger than required and which causes cross talk.

To deal with this problem, it has recently been proposed in pending European patent application EP 03100817.0 to use a conventional optical reading device and to provide the information layer of the record carrier with a diffraction grating for directing radiation of the read beam, which is perpendicularly incident on the information layer, in a direction at an acute angle to the chief ray of the incident beam. Providing the record carrier with such a diffraction grating allows reading with super resolution whilst using a read beam which is perpendicularly incident on the record carrier and passes perpendicularly through the carrier substrate so that no coma and astigmatic aberration occurs. Perpendicularly incident is understood to mean that the chief ray of the incident read beam, which is currently a converged beam, is perpendicular to the record carrier. The diffraction grating is called a regular, or informationless, grating to distinguish it from the diffractive information structure.

As described in EP patent application 03100817.0, the regular diffraction grating deflects portions of the first-order beams formed by the diffractive information structure such that these portions pass through the objective lens and are focused, together with radiation that is double refracted in the zero order, on the radiation-sensitive detector to interfere at the location of this detector. This detector may be the same as used in the read device disclosed in U.S. Pat. No. 4,242,579. Reference is made to the EP patent application 03100817.0 for further details about the effect of the regular grating in the information layer and for embodiments of the record carrier provided with such a grating.

If $K_g$ is the periodicity, or spatial frequency of the regular grating and $K_i$ is the spatial frequency of the information or data structure in the information plane, the read beam will meet a structure showing an effective spatial frequency $K_e$, which is given by:

$$K_e = K_i m . K_g$$

wherein m is the used diffraction order of the regular grating, which is usually a first order. $K_e$ will remain smaller than the conventional cut-off frequency if the grating period of the regular grating is sufficiently large. This period determines the angle at which a sub-beam of a given diffraction order is deflected by the grating: the smaller the period, the greater the diffraction angle is.

Figure 8:
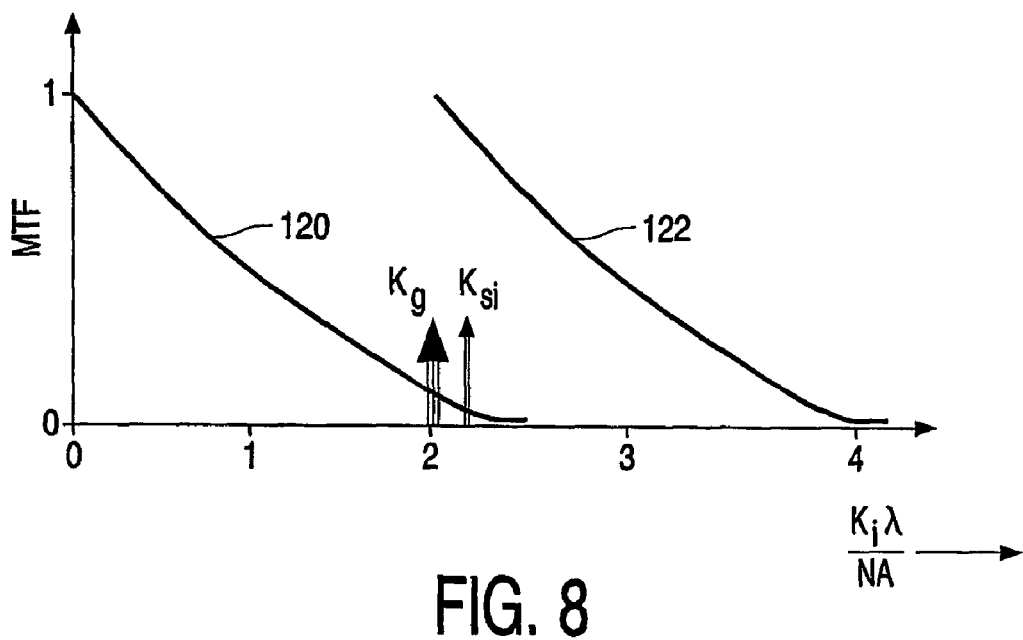
FIG. 8 shows the modulation transfer function as a function of a normalized spatial frequency in a conventional information layer and in an information layer provided with a grating having aligned nano-elements, respectively.

In this way an information structure having a largest spatial frequency of up to, for example, twice the conventional cut-off frequency can be read. This is illustrated in by means of the graphs 120 and 122 in FIG. 8. In this Figure, different values for $K_i.\lambda/NA$ are plotted on the horizontal axis whilst the value for the modulation transfer function (MTF) is plotted on the vertical axis. The MTF, whose maximum value is 1, is a measure for the amplitude of the information signal read from the information structure. Graph 120 represents the conventional, symmetrical situation, i.e. the entire zero-order sub-beam and portions of the two first-order sub-beams reflected by the information layer pass the objective lens and are used for information detection. The maximum spatial frequency $K_i$ of the information structure that can be read is given by $K_i.\lambda/NA=2$, so $K_i=2.NA/\lambda$. For this $K_i$ value, the amplitude of the read signal has decreased to almost zero, which means that an information area with such a spatial frequency cannot be read out. Graph 122 represents the situation that the information layer is provided with a diffraction grating having the proper grating frequency. This grating effects that asymmetrical portions of the zero-order sub-beam and of the first-order sub-beams pass the objective lens. Now the amplitude of the read signal becomes zero for $K_i.\lambda/NA=4$, so for $K_i=4.NA/\lambda$, which is twice the conventional cut-off frequency.

Providing the information layer with the grating renders reading of an information structure having spatial frequencies in the range from $2.NA/\lambda$ to $4.NA/\lambda$ possible and thus shifts the band of spatial frequencies that can be read over $m.K_g$. However, the width of the frequency band is not increased and remains $2.NA/\lambda$.

According to an important aspect of the present invention, the bandwidth can be increased by providing the information layer with the special diffraction grating described hereinbefore. This optimally utilizes the polarization sensitivity of the diffraction grating. If the information layer is scanned by a radiation beam having two components with mutually perpendicular polarization directions, an information structure having spatial frequencies from theoretically zero up to $4.Na/\lambda$ can be read. The beam component which has its polarization direction parallel to the orientation of the nano-elements in the diffraction grating, i.e. the beam component that is diffracted by the grating is used for reading the high-frequency information areas. The other beam component, which is not diffracted by the grating, is used in the conventional way to read the low-frequency information areas, i.e. the information areas having a spatial frequency of up to $2.NA/\lambda$.

Figure 9:
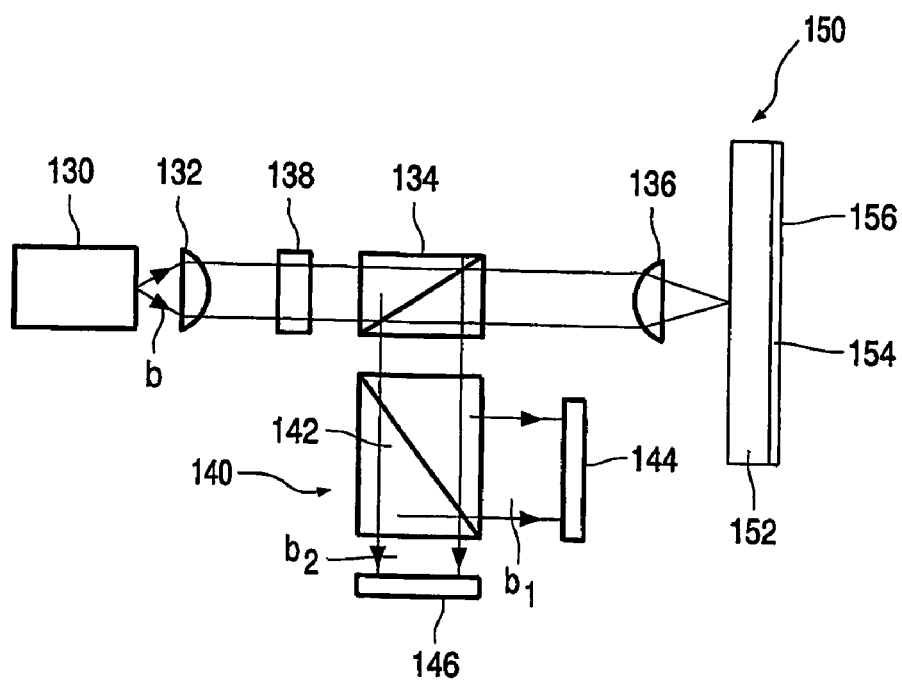
FIG. 9 shows an embodiment of a read device by means of which this record carrier can be read.

A device as shown in FIG. 9 may be used for reading a record carrier having an information structure showing a large spectrum of spatial frequencies. This device comprises a diode laser 130 that emits a single radiation beam b, a collimator lens 132, a beam splitter 134, an objective lens 136, and a detection branch 140. The read beam b should comprise two mutually perpendicularly polarized components. Such a beam may be obtained by orientating the cavity slit of the diode laser in an appropriate direction, such that the polarization direction of the linearly polarized laser beam encloses an angle of 45° with the orientation direction of the nano-elements in the grating 156 on the information layer 154 of the record carrier 150, which has a substrate 152. Alternatively and as shown in FIG. 9, a $\lambda/2$-plate may be arranged between the diode laser and the beam splitter, which plate converts the linearly polarized laser beam into a circularly polarized laser beam, which is composed of the two mutually perpendicularly polarized beam components. The reflected beam components $b_1$ and $b_2$, which have been modulated by information areas of high frequency and information areas of low frequency, respectively, have to be detected separately. This can be realized by including a polarization-sensitive beam splitter 142 in the detection branch, which splitter reflects beam component $b_1$ to detector 144 and passes beam component $b_2$ to detector 146. One of these detectors supplies a signal with frequencies up to the conventional cut-off frequency, and the other detector supplies a signal having frequencies from the conventional cut-off frequency up to twice this frequency.

Figure 10:
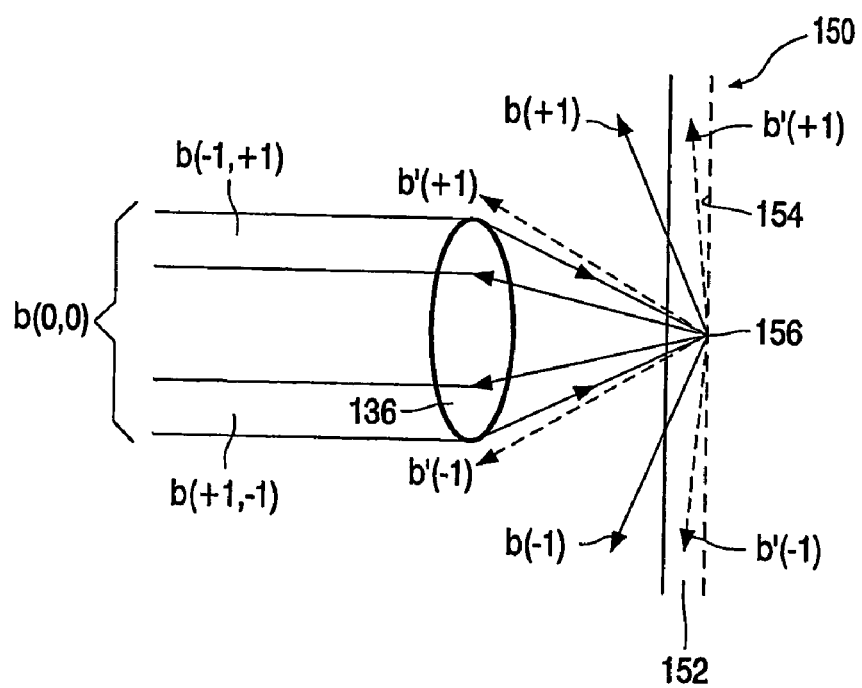
FIG. 10 shows the effect a grating with aligned nano-elements has on the sub-beams diffracted by an information structure.

FIG. 10 shows the effect a regular grating has on the sub-beams diffracted by an information structure. This Figure shows only those elements of FIG. 9 which are relevant to the inventive use of the new diffraction grating in a record carrier, namely the objective lens system 136 and the record carrier 150 with the information layer 154 and the diffraction grating 156. This grating splits an incident radiation beam into a zero-order sub-beam, a plus first-order sub-beam b'(+1) and a minus first-order sub-beam b'(−1), which are denoted by interrupted arrow lines in FIG. 10. The period of the regular grating is larger than the period of the information structure in the information layer, so that the sub-beams b'(+1) and b'(−1) are deflected by the regular grating at an angle that is smaller than the angle at which the sub-beams b(+1) and b(−1) are deflected by the information structure. The sub-beams b(+1) and b(−1) are denoted by a single solid line in FIG. 10. As the grating 156 is superimposed on the information structure 154, each of the first-order sub-beams b(0), b(+1) and b(−1) formed by the information structure will be further diffracted by the grating in double diffracted zero-order and first-order sub-beams. Of these double diffracted sub-beams, the sub-beams b(+1,−1) and b(−1,+1) will pass through the pupil of the objective lens system, as shown in FIG. 10. The first and the second index of these sub-beams relate to the order of the diffraction caused by the information structure and by the regular grating, respectively. The sub-beam b(0,0), which has the same, but opposite direction as the incident read beam, also passes through the pupil of the objective lens system 136. In this way it is achieved that portions of the first-order sub-beams, which are modulated by the information structure, interfere with a portion of the zero-order sub-beam at the location of the radiation-sensitive detection system, and reading with substantially enhanced resolution becomes possible.

This type of reading is used for the information areas having a high spatial frequency, up to twice the conventional frequency, and can only be performed by the component of the read beam that has a polarization direction parallel to the direction of the nano-elements in the grating 156. The other beam component, which is not diffracted by the grating, can only read the information areas having a lower spatial frequency, up to the conventional cut-off frequency.

As is discussed in co-pending EP 03100817.0 for a conventional grating, the direction of the grating strips of the regular grating can be adapted to the arrangement of the information areas in the information layer. If these areas are arranged in tracks, said direction may be parallel to the track direction, but preferably is perpendicular to the track direction. If the information areas are arranged according to a 2D-OS (two-dimensional optical storage) structure, i.e. a structure composed of blocks each comprising a number of information areas which are simultaneously read, for example by a matrix of a corresponding number of detectors, the direction of the grating strips is preferably diagonal to the blocks. Further details about this aspect can be found in EP 03100817, which is incorporated herein by reference with respect to the aspect.

The invention has been described with reference its applications, in the form of a diffraction grating, in the field of optical recording technology. This does not mean that the use of the grating according to the invention is limited to this technology. The grating according to the invention may be used in any optical system where two beams travelling along the same path are used, one of which has to be diffracted and the other has not and, more in general, in any optical system where a conventional diffraction grating is used.

Figure 11:
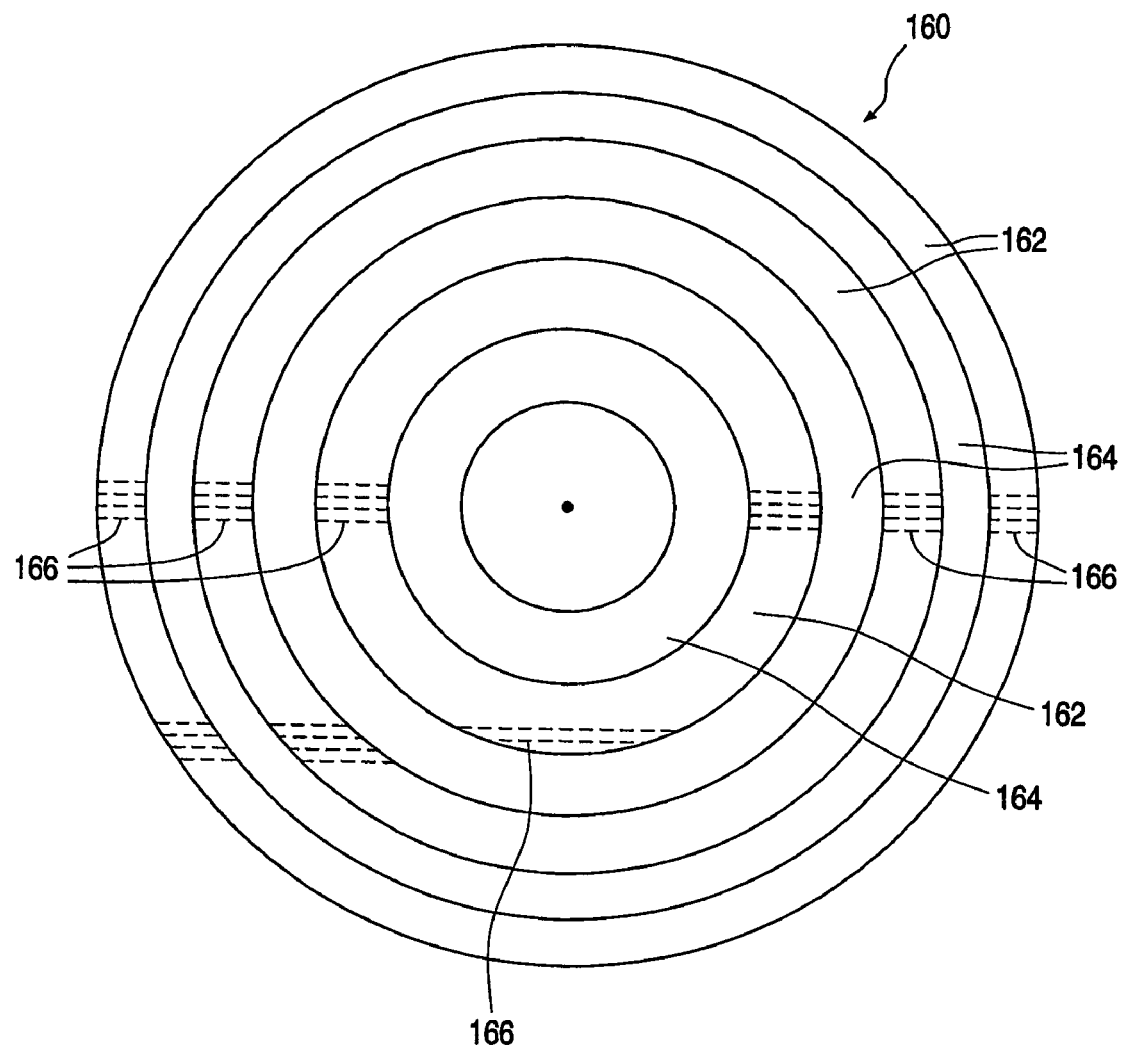
FIG. 11 shows an embodiment of a Fresnel lens provided with a diffraction structure according to the invention.

The invention may be used not only in a diffraction grating, but in any diffraction element which is composed of first areas, strip- or otherwise shaped, which alternate with second areas, which first and second areas have different optical properties. Another well-known example of such a diffraction element is a Fresnel (zone) lens. FIG. 11 shows an embodiment of a Fresnel lens 160 according to the invention. This lens is composed of first annularly shaped strips 162 which alternate with second annularly shaped strips 164. The first strips 162 comprise aligned nano-elements 166, whilst the second strips 164 do not comprise such elements. The first strips absorb radiation that is polarised in the direction of alignment of the nano-elements, and the element 160 acts as a Fresnel lens for such radiation. For radiation that is polarized in a direction perpendicular to the direction of alignment, the element 160 is a neutral plate. Only a few strips have been shown in FIG. 11 for clarity's sake, in practice the number of strips may be much larger. The width of strips 162 and 164 may decrease from the centre to the border.

The Fresnel lens structure may be manufactured in a similar way as described above for the linear grating.

The invention claimed is:

1. An optical diffraction element comprising a diffraction layer which is divided in diffraction strips alternating with intermediate strips, characterized in that the diffraction strips comprise nano-element tubes which are embedded in the diffraction layer and all have their symmetry axes aligned in one direction.

2. An optical diffraction element as claimed in claim 1, characterized in that the nano-elements are nanowires.

3. An optical diffraction element as claimed in claim 1, characterized in that the nano-elements are nanotubes.

4. An optical diffraction element as claimed in claim 3, characterized in that the nanotubes are carbon nanotubes.

5. An optical diffraction element as claimed in claim 4, characterized in that the nanotubes are single-wall nanotubes.

6. An optical diffraction element as claimed in any one of claims 1 to 5, characterized in that it is a transmission element.

7. An optical diffraction element as claimed in claim 1, characterized in that it is a reflective element.

8. An optical diffraction element as claimed in claim 3, characterized in that the material of the diffraction layer is essentially solid at temperatures below 30° C.

9. An optical diffraction element as claimed in claim 3, characterized in that the material of the diffraction layer is liquefiable at temperatures below the temperature at which the nano-element tubes get destroyed.

10. An optical diffraction element as claimed in claim 3, characterized in that the material of the diffraction layer is selected from the group consisting of glasses with melting or glass temperatures below 800° C., acrylic thermoplastics, and paraffins.

11. An optical diffraction element as claimed in claim 1, characterized in that it is shaped as and acts as a linear diffraction grating, and in that the diffraction strips are straight grating strips.

12. An optical diffraction element as claimed in claim 1, characterized in that it is shaped as and acts as a two-dimensional diffraction grating, and in that it comprises two sets of straight diffraction strips, the strips of the first set being perpendicular to the strips of the second set.

13. An optical diffraction elements as claimed in claim 1, characterized in that it is shaped as and acts as a Fresnel lens, and in that the diffraction strips are annular strips.

14. A method of manufacturing the optical diffraction element as claimed in claim 1, characterized by the steps of:—printing a pattern of strips comprising a solution containing nano-element tubes;
    aligning the nano-element tubes in a required direction by means of an electric or magnetic aligning field; and
    fixing the orientation of the nano-element tubes in said direction by treating the solution in the presence of the aligning field.

15. A method as claimed in claim 14, characterized in that treating the solution comprises evaporating the solution.

16. A method as claimed in claim 14, characterized in that treating the solution comprises polymerizing the solution.

17. A method of manufacturing the diffraction element as claimed in claim 1, characterized by the steps of:
    spin-coating a surface area of a substrate with a thin film of a solution containing nano-element tubes;
    aligning the nano-element tubes in a required direction by means of an electric or magnetic aligning field;
    fixing the orientation of the nano-element tubes in said direction by treating the solution in the presence of the aligning field; and
    baking out strip-shaped areas of the film so as to obtain a pattern of strips comprising aligned nano-element tubes, which strips form the diffraction strips.

18. A method as claimed in claim 17, characterized in that the step of baking out
is performed by exposing the solution to radiation of sufficient energy via a mask having a pattern of transparent and non-transparent strips corresponding to the element pattern such that a pattern, of strips comprising aligned nano-elements tubes remains, which strips form the diffraction strips.

19. A method as claimed in claim 17, characterized in that the step of baking out
is performed by scanning a sufficiently intense radiation beam strip-wise across the solution, such that a pattern of strips comprising aligned nano-elements remains, which strips form the diffraction strips.

20. A method of manufacturing the diffraction element as claimed in claim 1, characterized by the steps of:

coating a substrate area with a layer of self-assembled material;

strip-wise modifying the material of the layer so that a pattern of strips, which wet to the substrate surface, is obtained, and removing the rest of the layer material;

spin-coating a liquid containing nano-elements over the pattern thus obtained, whereby the liquid wets only the bare substrate so that a pattern of liquid strips containing nano-elements is obtained;

aligning the nano-elements in the liquid strips in a required direction by means of an electric or magnetic aligning field; and fixing the orientation of the nano-elements in said direction by treating the liquid in the presence of the aligning field, thereby obtaining a pattern of strips containing aligned nano-elements, which form the diffraction strips.

21. A method as claimed in claim 20, characterized in that the step of modifying the material of the layer comprises scanning the layer strip-wise by a beam of radiation.

22. A method as claimed in claim 20, characterized in that the step of modifying
the material of the layer comprises illuminating the layer via a mask having a pattern of transparent slits corresponding to the strip pattern of the element.

23. A method of manufacturing the diffraction grating as claimed in claim 1, characterized by a process of catalytic growing of nano-elements on a substrate surface from a layer deposited on the substrate and comprising nano-element material, and of baking out strip-shaped areas of the layer so as to obtain a pattern of strips comprising aligned nano-elements, which strips form the element strips.

24. An optical record carrier comprising at least one information layer in which information is encoded in information areas which alternate with intermediate areas, characterized in that the information is covered by a diffraction grating as claimed in claim 1.

25. A device for reading and recording an optical information carrier of a first type having a first information density and an optical information carrier of a second type having a second information density, which device comprises a radiation source unit supplying a first radiation beam having a first wavelength for cooperating with the first type of information carrier and a second radiation beam having a second wavelength for coöperating with the second type of record carrier, and an objective system for focusing the first and the second beam on an information layer of the first and the second type of record carrier, respectively, characterized in that a diffraction grating as claimed in claim 1 is arranged between the radiation source unit and the objective system in the common radiation path of the first and the second radiation beam, and in that one of the radiation beams has a first polarization direction parallel to the direction of the nano-elements in the grating, whilst the other beam has a polarization direction perpendicular to the first polarization direction.

* * * * *